United States Patent [19]

Savkar

[11] 4,185,455

[45] Jan. 29, 1980

[54] FUEL PULSATION-SUPPRESSION FOR GAS TURBINE COMBUSTION SYSTEM

[75] Inventor: Sudhir D. Savkar, Scotia, N.Y.

[73] Assignee: General Electric Company, Schenectady, N.Y.

[21] Appl. No.: 830,112

[22] Filed: Sep. 2, 1977

[51] Int. Cl.² .......................... F02C 7/22; F04B 11/00
[52] U.S. Cl. ..................................... 60/39.06; 417/540
[58] Field of Search ................. 60/39.06; 417/540, 542

[56] References Cited

U.S. PATENT DOCUMENTS

| | | | |
|---|---|---|---|
| 1,571,781 | 2/1926 | Aldrich | 417/540 |
| 1,862,823 | 6/1932 | Holveck | 417/540 |
| 2,474,512 | 6/1949 | Bechtold et al. | 417/540 |
| 3,307,492 | 3/1967 | Selwood et al. | 417/244 |
| 3,532,029 | 10/1970 | Roschupkin et al. | 417/539 |
| 4,115,041 | 9/1978 | Selwood | 417/523 |

*Primary Examiner*—Robert E. Garrett
*Attorney, Agent, or Firm*—Nathan D. Herkamp; Joseph T. Cohen; Paul R. Webb, II

[57] ABSTRACT

Rupture of the transition piece in one or more combustors of a gas turbine, due to resonance at the transition piece natural modal frequency, is avoided by interconnecting pairs of fuel lines having sinusoidal fluctuations in fuel flow that are 180° out of phase with each other through opposite ends of an accumulator containing a movable partition displaced according to relative pressure on either side of the partition.

7 Claims, 8 Drawing Figures

FUEL PULSATION-SUPPRESSION FOR GAS TURBINE COMBUSTION SYSTEM

INTRODUCTION

This invention relates to gas turbines, and more particularly to a method and apparatus for extending the lifetime of the combustion system transition piece in a gas turbine.

Gas turbines are normally considered to be continuous fuel flow and combustion machines. The turbine typically comprises, as its three major components, compressor means, combustor means, and the turbine itself. In the compressor, both pressure and temperature of incoming air are increased, since the compression process takes place with negligible heat loss. The compressed, heated air is then furnished to the combustors, supplying heat for the operating cycle. During this combustion process, the temperature of the gas is raised to high levels, but the average pressure remains essentially constant. Although near stoichiometric temperatures (i.e., 3000° F. and higher) are reached locally within the primary combustion zone, by the time the hot gases enter the turbine section, the average temperature has been reduced to the cycle firing temperature level. As the hot gases pass through the turbine, gas pressure and temperature decrease. As the gas expands (with negligible heat loss), it imparts energy to the turbine, enabling the turbine to perform work. Roughly half the work produced by the turbine is typically required to drive the compressor, and the remainder is available for useful productive work.

Speed and output power of the gas turbine are controlled by metering the fuel flow. Temperature in the primary combustion zone is near stoichiometric in order to maintain essentially 100% combustion efficiency. The temperature is decreased by addition of compressor discharge dilution air to meet requirements of the operating cycle, including the turbine temperature and other operating profile requirements. Typical combustion systems usually include a plurality of combustor chambers, various machines having six, ten, twelve or fourteen combustors each.

A problem that has been encountered in gas turbines involves an excessively large number of failures of the transition piece connecting the combustor to the nozzle of the first stage of the turbine, due to vibration. Although combustion instability is sometimes the cause of this problem, severe vibrations resulting from periodic fluctuations in the fuel supply to the combustor fuel nozzle of oil-fired machines are often the major cause of transition piece failures on such machines. The source of these flow fluctuations is the so-called flow divider which provides fuel from a common supply line to each of the combustors.

On a ten combustor machine, for example, the fuel flow divider essentially comprises a set of ten positive displacement pumps. Typically these pumps comprise gear pumps driven by a single rotating drive means. Fuels from each of these gear pumps is supplied in repetitious, discrete slugs, so that fuel flow to each combustor is of a pulsating nature. Each gear pump may typically produce either one or two fuel pulses per pair of meshed gear teeth, depending upon the particular gear pump design. Since frequency of the fuel pulses therefore varies linearly with flow divider speed which, in turn, varies with load on the turbine, these fuel pulse frequencies are likely to coincide with the natural modal frequencies of the transition piece somewhere within the range of loads on the turbine. As a result, the transition piece in any combustor may easily be driven into a resonant condition by the pulsating flow of fuel and its combustion. Such fuel fluctuations therefore cannot be tolerated.

The fuel supply fluctuations are essentially sinusoidal in nature, and hence possess a distinct phase imposed by the flow divider operation. The invention described and claimed in my application Ser. No. 792,874, filed May 2, 1977, now abandoned, and assigned to the instant assignee exploits this characteristic by employing a phase cancellation process which automatically tracks the flow divider output pulses over their entire frequency range. In this manner, fluctuations in the combustion process are smoothened without in any way altering the average pressure within the combustor. The transition piece is accordingly not driven at its natural modal frequency, and its rupture due to vibration at that frequency is thereby avoided.

As in the aforementioned application Ser. No. 792,874, the present invention also employs a phase cancellation process that automatically tracks the flow divider output pulses over their entire frequency range, but without need for employing an extra fuel flow divider or for doubling the number of pump egress ports on a conventional fuel flow divider. Instead, pairs of pump egress ports on a conventional fuel flow divider are identified such that the relative phase in fuel flow between each of the two lines receiving fuel from the selected pair of egress ports is equal to, or approximately equal to, 180°. An accumulator containing a light piston, or a diaphragm, is then inserted between the two legs of each identified pair of fuel lines supplying fuel to the combustors so as to interconnect the two legs in a manner that suppresses fuel fluctuations in each while maintaining independent fuel flow to each individual combustor.

Accordingly, one object of the invention is to provide a simplified method and apparatus for achieving an extended lifetime for the transition piece of a gas turbine combustor.

Another object is to provide a method and apparatus for achieving combustion without periodic pressure fluctuations in the combustors of a gas turbine, the apparatus being especially adapted for retrofitting existing gas turbines.

Another object is to provide a simplified method and apparatus for eliminating pulsations in the liquid fuel supply for a gas turbine combustion system.

Briefly, in accordance with a preferred embodiment of the invention, a method of suppressing pulsations in the combustors of the turbine comprises distributing fuel from a fuel flow divider to each of the combustors, respectively, through a plurality of fuel lines, respectively, each fuel line carrying fuel at a predetermined flow rate with sinusoidal pressure fluctuations, and identifying, for each of the fuel lines, pairs of the fuel lines in which the sinusoidal pressure fluctuations are at least approximately 180° out of phase with each other. Fuel is directed from each fuel line, respectively, in each pair of fuel lines, respectively, toward a chamber, respectively, of variable volume dependent upon instantaneous pressure differential between the fuel lines of each pair, respectively. The sinusoidal pressure fluctuations in fuel flowing in each pair of fuel lines are accommodated by the respective chamber of variable volume coupled thereto, leaving but minimal fluctuations in the fuel line between the respective chamber and the respective combustor.

In accordance with another preferred embodiment of the invention, in the liquid fuel supply apparatus for a gas turbine combustion system including a plurality of combustors, means for allocating fuel to each of the combustors, respectively, comprises a fuel flow divider impelling a periodically-fluctuating flow of the fuel toward each of the combustors through individual fuel lines, respectively. Accumulator means divided into a pair of chambers by a positionable partition therein are coupled to each pair of fuel lines, respectively, exhibiting periodic fluctuations in flow of fuel impelled by the flow divider that are at least approximately 180° out of phase with each other. Instantaneous pressure drop across the positionable partition determines the instantaneous location of the partition within the accumulator means, since the partition moves to equalize pressure on either side thereof. Accordingly, instantaneous volume of each chamber defined by the positionable partition within the accumulator means varies in accordance with the partition position. The varying volume within each chamber of the accumulator means thereby absorbs pressure fluctuations applied thereto, thus smoothing the periodic fluctuations in fuel flowing to the combustors.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
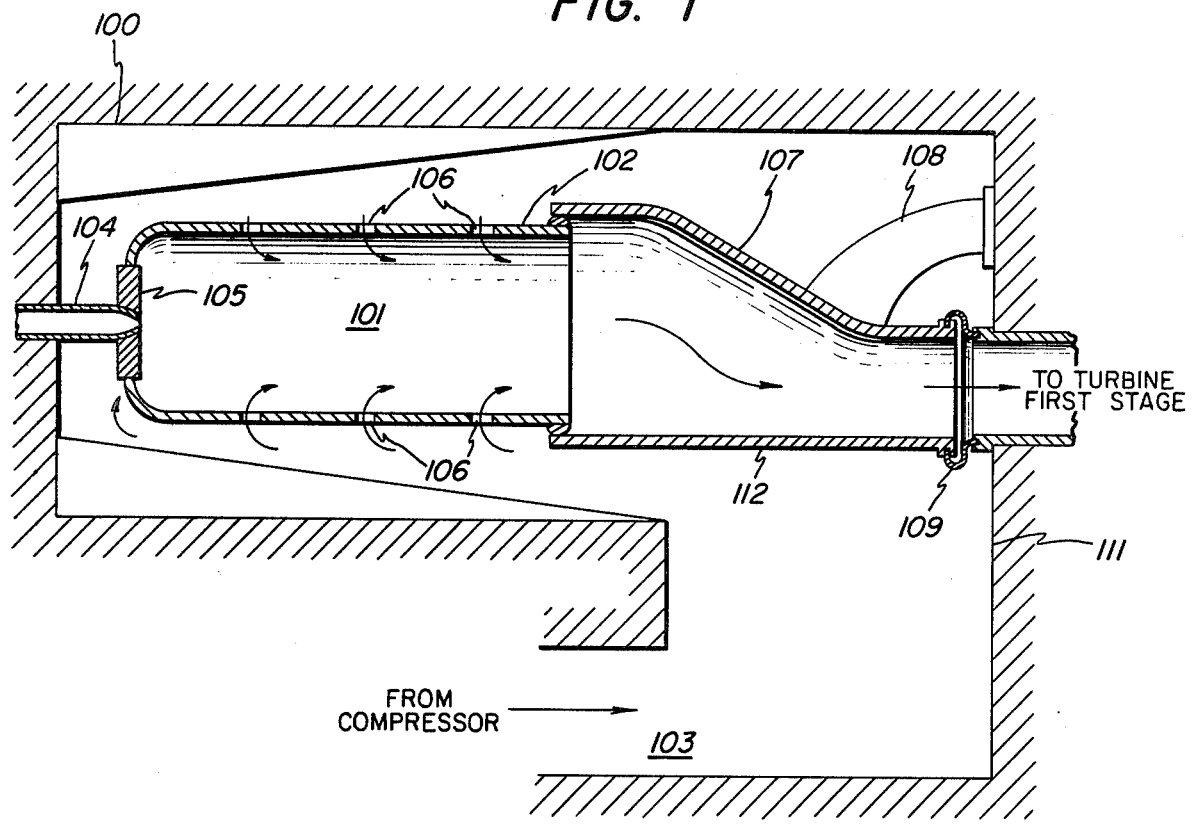
FIG. 1 is a schematic sectional view of a portion of a gas turbine combustion system.

FIG. 1 illustrates a portion of a combustion system 100 wherein a combustion chamber 101, also known as a combustor or a can, is defined by a combustion liner 102. Liquid fuel supplied through piping 104 is normally mixed with compressed air in a mixing nozzle 105 and sprayed in atomized form, along with additional air, into combustion chamber 101 where it is ignited and burned. Air from the turbine compressor also enters the combustion system through a passageway 103 and passes through dilution holes 106, in the direction of the arrows, into chamber 101 to limit the temperature of the combustion therein. The gaseous mixture flows from combustion chamber 101 through a transition piece 107, which includes a lower panel 112. Transition piece 107, which is supported by a mounting bracket 108, directs the gaseous flow from circular combustion chamber 101 to an annular inlet passageway for the first stage of the turbine (i.e., the initial vanes or buckets encountered by the gases). In order to accommodate the normal pressures and temperatures created by the combustion in combustion chamber 101, transition piece 107 is terminated at a floating seal 109 mounted on the combustion system casing 11.

Figure 2:
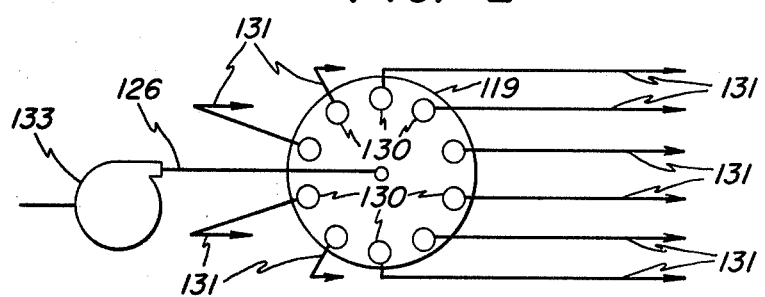
FIG. 2 is a schematic illustration of a typical, conventional fuel flow divider.

FIG. 2 is a schematic designation for a fuel flow divider, such as described in detail in my aforementioned application Ser. No. 792,874. Thus a positive displacement fuel pump 133, typically of the well-known gear pump type, supplies liquid fuel to flow divider 119 through a central conduit 126. Fuel is supplied, in a pulsating flow, from each of egress ports 130, respectively, of the flow divider through the associated one of output passageways 131 to individual combustion chambers, respectively, of the gas turbine.

Figure 3:
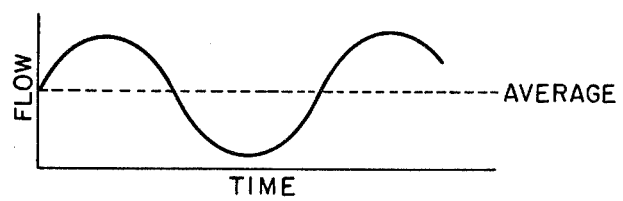
FIG. 3 is a graphical illustration of fluctuations in the flow of fuel supplied by the fuel flow divider shown in FIG. 2 to any single combustion chamber of a gas turbine.

FIG. 3 illustrates fuel flow, with respect to time, in any one of output passageways 131 from flow divider 119 shown in FIG. 2. The periodic flow pulsations are of sinusoidal nature, as indicated by the solid curve, even though the time average of fuel flow volume is essentially constant at a predetermined value, as indicated by the dashed line.

Figure 4:
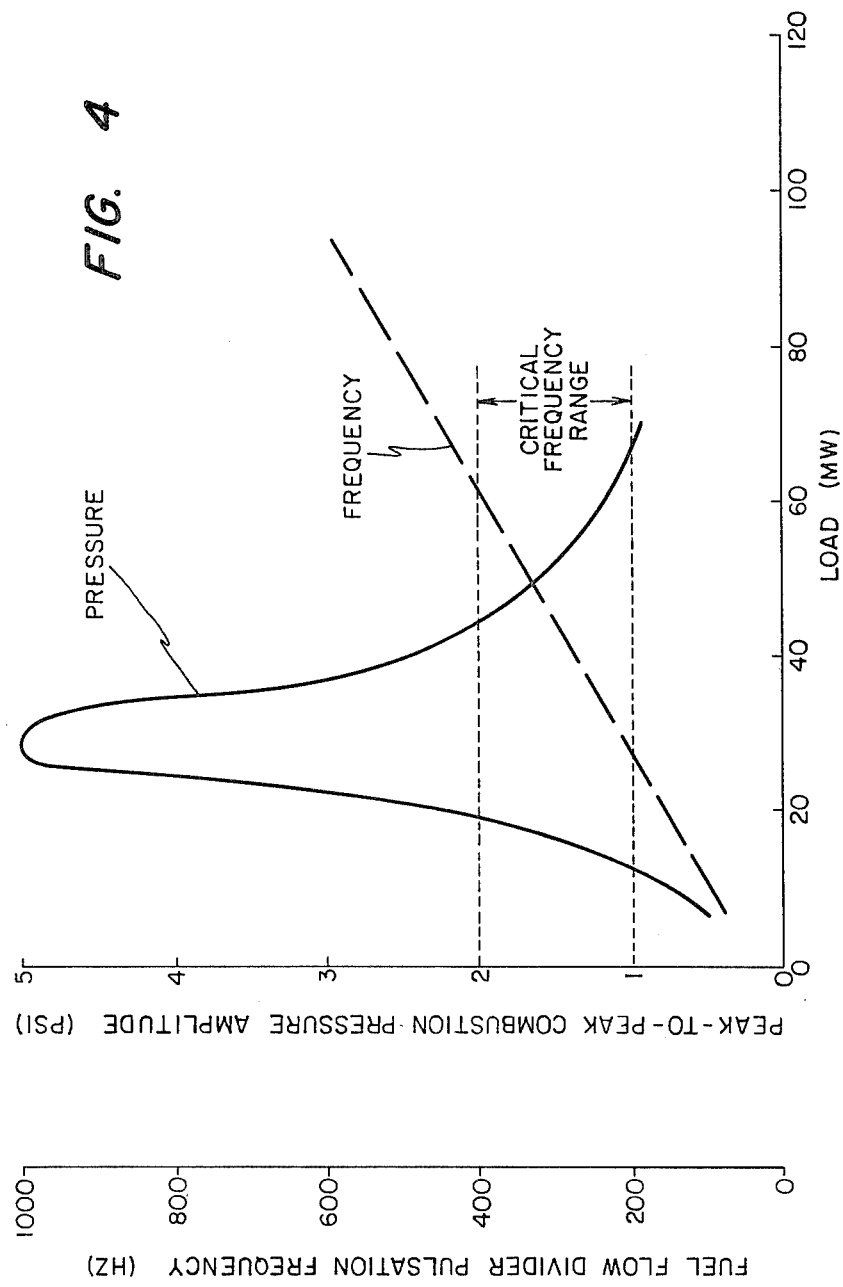
FIG. 4 is a graphical illustration of an example of variation in combustion pressure and fuel pulse frequency, with turbine load, for any single combustion chamber of a gas turbine.

FIG. 4 graphically illustrates an example of variation in both peak-to-peak combustion pressure amplitude and fuel flow divider pulsation frequency, with load on a typical gas turbine, expressed in megawatts, for the fuel supply to any single combustion chamber. As load on the turbine increases, peak-to-peak combustion pressure amplitude, illustrated by the solid line, rises steeply to a peak value which can be as high as 5 pounds per square inch when the gas turbine load is approximately 30 megawatts and then drops off steeply as load continues to rise. Additionally, as shown by the dashed line, the fuel flow pulsations increase linearly with load. When the gas turbine load is at such level that pulsation frequency in fuel supplied by the flow divider is between 200 and 400 Hz (and hence the gas turbine load is between approximately 28 and 64 megawatts), deleterious vibrations occur in the combustion chambers of the gas turbine.

Flow fluctuations in fuel supplied to the combustor result in induced fluctuations within the combustor itself as the pulsating fuel is consumed. A theory on how damage to the combustor results from these induced pressure fluctuations may be visualized by referring again to FIG. 1. Initially, the induced vibrations in transition piece 107 cause lower panel 112 to crack and collapse, while also causing fatigue cracks due to stress concentration where mounting bracket 108 is supportively affixed to transition piece 107. Considerable wear also occurs at floating seal 109. Moreover, after lower panel 112 collapses, air from the turbine compressor entering passageway 103 tends to bypass the interior of combustion chamber 101 and instead flow directly to the first stage of the turbine. During this time, however, liquid fuel mixed with compressed air continues to be supplied from mixing nozzle 105 into combustion chamber 101. With a deficiency of air being supplied from compressor 103 through dilution holes 106, complete combustion within the combustion chamber is believed to be inhibited. Since the fuel mixture continues to be sprayed into the combustor, much of it likely evaporates in the combustion when it strikes the heated combustor walls. As the unburned, evaporated fuel in the combustor accumulates, it builds up to an explosive mixture. Consequently, an explosion is likely to occur inside the combustor, causing violent rupture of casing 111 and all the associated dangers to personnel and equipment resulting from such explosion.

Previous approaches I have taken for preventing the aforementioned undesirable consequences of fuel flow vibrations are described and claimed in my aforementioned application Ser. No. 792,874. In the present invention, pulsations set up in the fuel flow divider, such as flow divider 159 shown in FIG. 5 receiving liquid fuel from fuel pump 153 through conduit 158 and having output passageways 141–150, each connected to a respective one of egress ports 140. Output passageways 141 and 145 of flow divider 159, connected to cans 1 and 5, respectively, through inlet passageways 171 and 172, respectively, are jointed together through an accumulator 160. These passageways are selected to be joined because the sinusoidal fuel flow fluctuations in passageway 141 are more nearly 180° out of phase with those in passageway 145 than with the fluctuations in any other of passageways 145–150. Although not shown for simplicity of illustration, the other passageways 142–144 and 146–150, each being connected to a separate can, respectively, are similarly paired off according to approximate 180° phase difference between fluctuations in fuel flowing in each of the passageways, and interconnected through an accumulator in a fashion similar to the interconnection of passageways 141 and 145 through accumulator 160.

Figure 5:
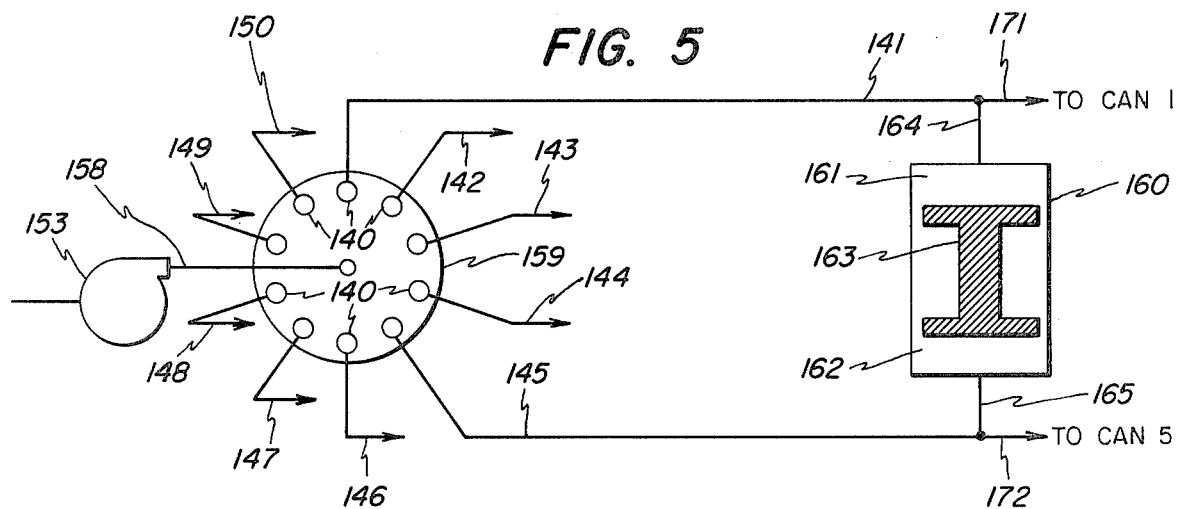
FIG. 5 is a schematic illustration of one embodiment of the invention.

Accumulator 160, shown schematically in FIG. 5, and typical of those joining other pairs of passageways besides passageways 141 and 145, comprises a housing divided into two chambers 161 and 162 of variable volume. The chambers are separated by a positionable partition of low mass, such as a free piston 163. The location of low mass piston 163 within accumulator 160 is dependent upon the pressure differential between chambers 161 and 162, which are connected through coupling passageways 164 and 165, respectively, to fuel lines 141 and 145, respectively. That is, when instantaneous liquid fuel pressure in the leg supplying can 1 exceeds that in the leg supplying can 5, piston 163 moves along the inner surface of housing 160 in a direction to enlarge the volume of chamber 161 and reduce the volume of chamber 162, until the pressure across the piston equalizes. As a result, excess fuel flows from passageway 141 into accumulator chamber 161 and an equal volume of fuel is pumped out of accumulator chamber 162 into passageway 172. Therefore, instantaneous flow to can 1 is substantially prevented from increasing and that to can 5 is substantially prevented from decreasing. Conversely, when instantaneous liquid fuel pressure in the leg supplying can 5 exceeds that in the leg supplying can 1, piston 163 moves along the inner surface of housing 160 in a direction to reduce the volume of chamber 161 and enlarge the volume of chamber 162, until pressure across the piston equalizes. As a result, excess fuel flows from passageway 145 into accumulator chamber 162 and an equal volume of fuel is pumped out of accumulator chamber 161 into passageway 171. Therefore, instantaneous flow to can 1 is substantially prevented from decreasing and that to can 5 is substantially prevented from increasing. In this fashion, fuel flow to each of cans 1 and 5 is maintained substantially constant, as well as to each of the other cans having their fuel lines paired together through accumulator means in the manner exemplified in FIG. 6.

Figure 6:
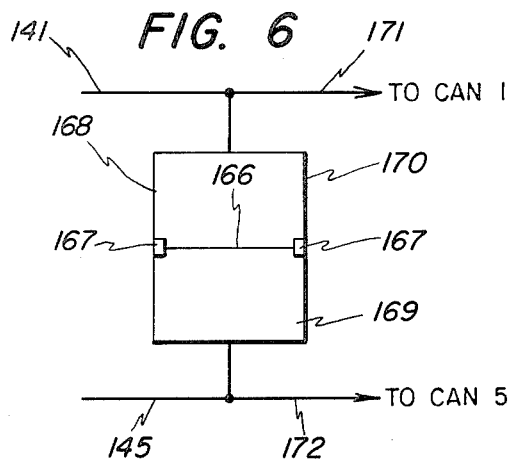
FIG. 6 is a schematic illustration of another embodiment of the invention.

FIG. 6 illustrates an accumulator of alternative construction to that of accumulator 160 shown in FIG. 5. In this embodiment, the positionable partition of accumulator 170 comprises a flexible diaphragm 166, affixed about its periphery 167 to the inner surface of the accumulator housing, dividing the accumulator into two variable volume chambers 168 and 169. Functioning of accumulator 170 shown in FIG. 6 is similar to that of accumulator 160 shown in FIG. 5 except that displacement of the fastened diaphragm is more restricted than that of the free piston. In general, larger percent changes in volume are permitted to occur in accumulator 160 of FIG. 5 than in accumulator 170 of FIG. 6 for any given pressure differential across the positionable partition.

Figure 7:
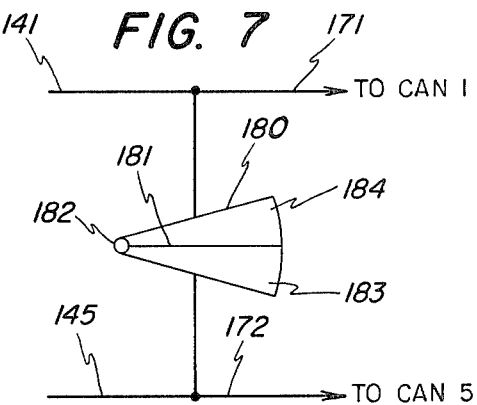
FIG. 7 is a schematic illustration of yet another embodiment of the invention.

FIG. 7 illustrates another alternative construction of accumulator in which a hinged diaphragm 181 is movable about a pivot point or hinge 182 affixed to the wall of an accumulator 180. Diaphragm 181 divides the accumulator into two variable volume chambers 183 and 184. Functioning of accumulator 180 is somewhat similar to that of accumulator 160 shown in FIG. 5, except that displacement of the hinged diaphragm is more restricted than that of the free piston, and is also somewhat similar to that of accumulator 170 shown in FIG. 6, except that displacement of the hinged diaphragm is less restricted than that of the diaphragm having its periphery fastened to the interior of accumulator 170. In general, larger percent changes in volume are permitted to occur in accumulator 180 of FIG. 7 than in accumulator 170 of FIG. 6, for any given pressure differential across the positionable partition therein.

Figure 8:
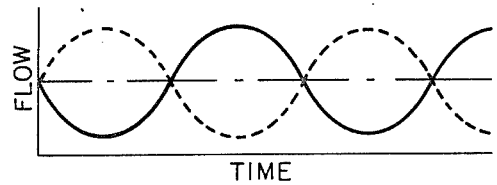
FIG. 8 is a graphical illustration of fluctuations in the flow of fuel supplied to any pair of combustion chambers of a gas turbine through apparatus fabricated in accordance with the teachings of the instant invention.

FIG. 8 graphically illustrates the liquid fuel flow-smoothening process accomplished by the apparatus of the instant invention. On this curve of fuel flow versus time, the solid line may represent the pulsations in flow of fuel through passageway 141 to can 1 and the dotted line may represent the pulsations in flow of fuel through passageway 145 to can 5. The dot-dash line represents the flow of fuel to either can 1 or can 5 from flow divider 159, and is readily seen as a smooth, essentially nonpulsating flow. Fuel flow of this nature to a gas turbine combustion chamber obviates the induced pressure fluctuations which would otherwise occur in the chamber, thus reducing danger of damage to the combustion chamber transition piece and the consequential hazards to personnel and equipment which may result from such damage; that is, instead of periodic pressure fluctuations in the combustion chamber, a steady burning of fuel occurs.

The foregoing describes a simplified method and apparatus for achieving an extended lifetime for the transition piece of a gas turbine combustor. By employing the invention, combustion is achieved without periodic pressure fluctuations in the combustors, since pulsations in the liquid fuel supply to the combustors are thereby eliminated. The apparatus is especially adapted for retrofitting existing gas turbines since it merely involves connection of an accumulator between each pair of fuel lines exhibiting fluctuations that are approximately 180° out of phase with each other.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. The method of suppressing pulsations in the combustors of a gas turbine comprising:
   distributing fuel from a fuel flow divider to each of said combustors, respectively, through a plurality of fuel lines, respectively, said flow divider supplying fuel to each fuel line at a predetermined flow rate with sinusoidal pressure fluctuations;
   identifying, for each of said plurality of fuel lines, pairs of said fuel lines in which said sinusoidal pressure fluctuations are approximately 180° out of phase with each other; and
   at a location along each of said pairs of said fuel lines intermediate said flow divider and said combustors, directing fuel from each fuel line, respectively, in each pair of fuel lines, respectively, toward one of a pair of interconnected chambers, respectively, of variable volume dependent only upon instantaneous pressure differential between said each pair of fuel lines, whereby said sinusoidal pressure fluctuations are substantially eliminated in each of said fuel lines.

2. The method of suppressing pulsations in the combustors of a gas turbine comprising:
   distributing fuel from a fuel flow divider to each of said combustors, respectively, through a plurality of fuel lines, respectively, said flow divider supplying fuel to each fuel line at a predetermined flow rate with sinusoidal pressure and flow fluctuations;
   identifying, for each of said plurality of fuel lines, pairs of said fuel lines in which said sinusoidal pressure fluctuations are approximately 180° out of phase with each other; and
   at a location along each of said pairs of said fuel lines intermediate said flow divider and said combustors, varying the volume of fuel supplied by said fuel flow divider to each fuel line of each pair of fuel lines, respectively, in accordance only with instantaneous pressure differential between said each pair of fuel lines, whereby said sinusoidal pressure fluctuations are substantially eliminated in each of said fuel lines.

3. The method of claim 2 wherein the step of varying the volume of fuel supplied by said fuel flow divider to each of said fuel lines, respectively, comprises increasing by a predetermined amount the volume of fuel supplied to a combustor by the fuel line of said each pair receiving a relatively low flow from said fuel flow divider, and decreasing by said predetermined amount the volume of fuel supplied to another combustor by the fuel line of said each pair receiving a relatively high flow from said fuel flow divider.

4. In the liquid fuel supply apparatus for a gas turbine combustion system, said system including a plurality of combustors, means for allocating fuel to each of said combustors, respectively, comprising:
   a fuel flow divider impelling a periodically-fluctuating flow of said fuel toward each of said combustors, respectively, through a separate fuel line, respectively;
   a plurality of accumulator means each including positionable partition means dividing said accumulator means into a pair of chambers; and
   means coupling each of said chambers to a respective fuel line such that the fuel lines coupled to each accumulator means exhibit periodic fluctuations in flow of fuel impelled by said flow divider that are approximately 180° out of phase with each other, whereby said partition means moves to equalize pressure on either side thereof causing volume of each of said chambers to vary in a manner tending to suppress flow fluctuations in the fuel line respectively coupled thereto.

5. The apparatus of claim 4 wherein said partition means comprises a piston free to move within said accumulator means.

6. The apparatus of claim 4 wherein said partition means comprises a flexible diaphragm affixed about its periphery to the inner surface of said accumulator means.

7. The apparatus of claim 4 wherein said partition means comprises a diaphragm hinged at a pivot point affixed to the wall of said accumulator means.

* * * * *